(No Model.)
T. LESLIE.
SOLDERING PAN.
No. 313,218. Patented Mar. 3, 1885.
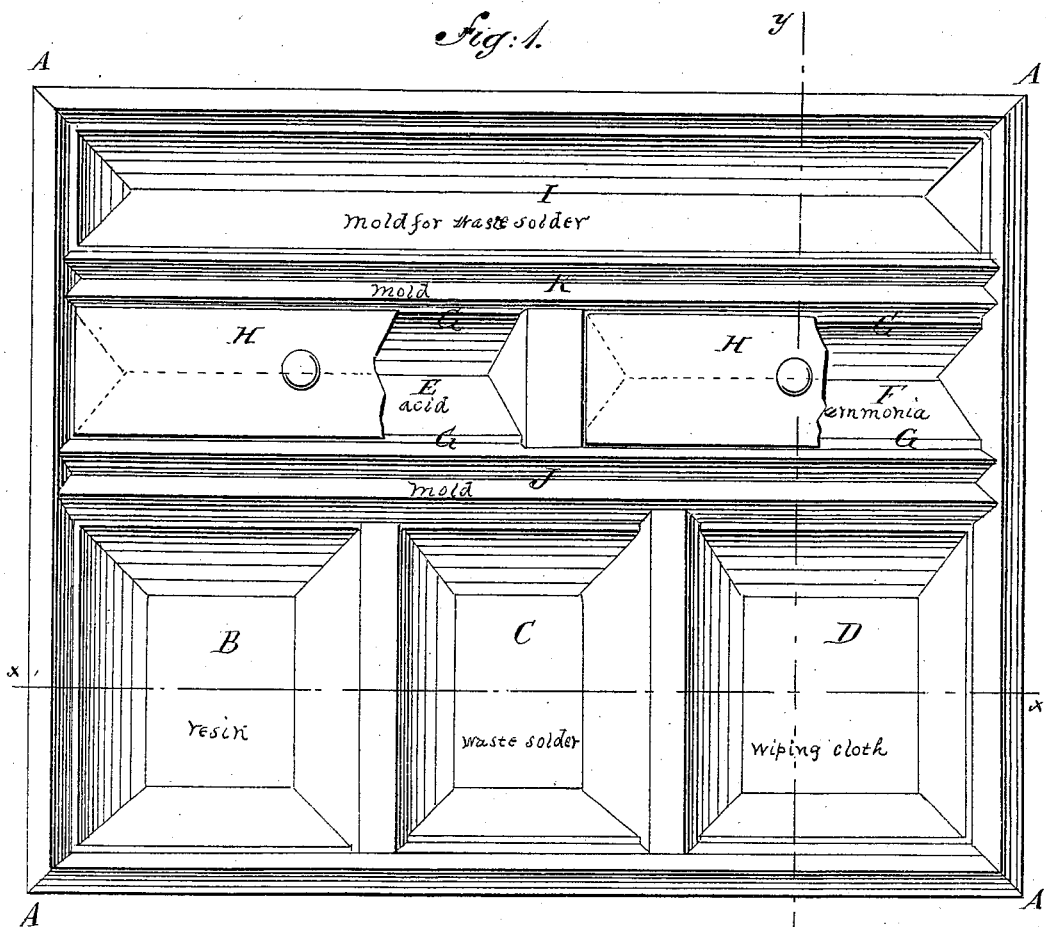
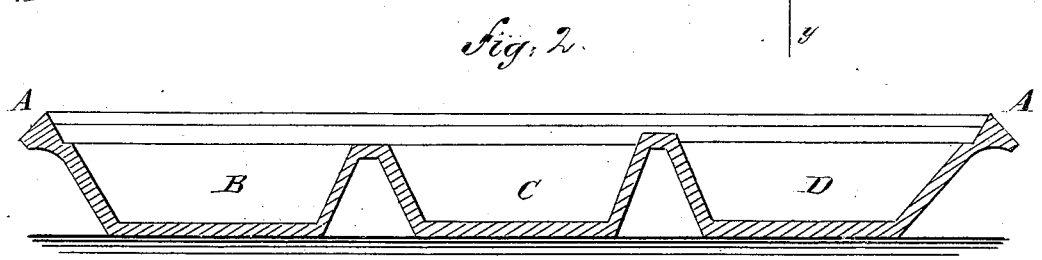
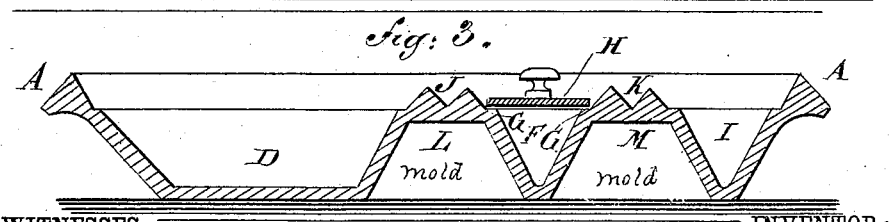
WITNESSES: Chas. Nida, C. Sedgwick
INVENTOR: T. Leslie
BY Munn & Co.
ATTORNEYS.

UNITED STATES PATENT OFFICE.

THOMAS LESLIE, OF BROOKLYN, NEW YORK.

SOLDERING-PAN.

SPECIFICATION forming part of Letters Patent No. 313,218, dated March 3, 1885.

Application filed December 27, 1884. (No model.)

*To all whom it may concern:*

Be it known that I, THOMAS LESLIE, of Brooklyn, in the county of Kings and State of New York, have invented certain new and useful Improvements in Soldering-Pans, of which the following is a full, clear, and exact description.

Reference is to be had to the accompanying drawings, forming part of this specification, in which similar letters of reference indicate corresponding parts in all the figures.

Figure 1 is a plan view of one of my improved soldering-pans, parts of the covers being broken away. Fig. 2 is a sectional front elevation of the same, taken through the line x x, Fig. 1. Fig. 3 is a sectional side elevation of the same, taken through the line y y, Fig. 1.

The object of this invention is to provide soldering-pans constructed in such a manner as to promote convenience and economize time and material in soldering operations.

The invention relates to a soldering-pan made with compartments to receive the resin, waste solder, wiping-cloth, acid, and ammonia, and molds for making the waste solder into bars, as will be hereinafter fully described and claimed.

A represents a soldering-pan, which can be made of cast-iron or other suitable material.

In the forward part of the pan A are three compartments, B C D, which are made with inclined sides, and which are designed to receive, respectively, resin, waste solder, and a cloth for wiping and cleaning the soldering-irons.

In the rear of the three compartments B C D are two compartments, E F, one of which is designed to receive acid and the other ammonia. The compartments E F are made with inclined sides and ends, and in the upper parts of the said sides are formed shoulders G, to serve as seats for the covers H, as shown in Figs. 1 and 3.

In the rear of the compartments E F is a sixth compartment, I, which is designed to serve as a mold for making waste solder into bars by placing the waste solder in the said compartment, melting it with a soldering-iron, and allowing it to cool.

The walls or partitions between the compartments B C D and the compartments E F, and between the compartments E F and the compartment I, are made wide, and in their tops are formed grooves or channels J K, to serve as molds for making waste solder into small bars.

The partition-walls of the pan A are made hollow, and are open at the outside of the bottom of the said pan, forming chambers, as shown in Figs. 2 and 3. The chambers L M in the walls having the mold-channels J K are designed to serve as molds for making large bars from waste solder, when desired, the said pan being inverted when the chambers L M are to be used for this purpose.

The compartments of the pan A can be variously arranged—as, for instance, the mold I can be omitted, the compartments E F placed at the ends of the series of compartments B C D, and the mold-channels J K formed in the tops of the partition-walls between the compartments B D and the compartments E F. By this arrangement a narrower pan will be formed, and for some special uses such narrow pan may be desirable; but for general use I prefer the arrangement shown in the drawings and first described as being most convenient.

Having thus described my invention, what I claim as new, and desire to secure by Letters Patent, is—

1. A soldering-pan made, substantially as herein shown and described, with compartments B C D and E F, and mold-channels J K in the tops of the partition-walls, as set forth.

2. A soldering-pan made, substantially as herein shown and described, with compartments B C D and E F, a mold-compartment, I, and mold-channels J K in the tops of the partition-walls, as set forth.

3. A soldering-pan made, substantially as herein shown and described, with mold-chambers L M formed in the wide partition-walls of its compartments, and with their open sides at the bottom of the pan, as set forth.

THOMAS LESLIE.

Witnesses:
JAMES T. GRAHAM,
C. SEDGWICK.